United States Patent
Li et al.

(10) Patent No.: US 11,223,945 B2
(45) Date of Patent: Jan. 11, 2022

(54) NETWORK OUTAGE DETECTION

(71) Applicant: Comcast Cable Communications, LLC, Philadelphia, PA (US)

(72) Inventors: Yubin Li, Philadelphia, PA (US); Jiongkuan Hou, Mount Laurel, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 16/596,820

(22) Filed: Oct. 9, 2019

(65) Prior Publication Data
US 2021/0112405 A1     Apr. 15, 2021

(51) Int. Cl.
*H04W 8/30* (2009.01)
*H04W 60/04* (2009.01)
*H04W 24/04* (2009.01)
*H04W 60/00* (2009.01)
*H04L 29/14* (2006.01)

(52) U.S. Cl.
CPC ............... *H04W 8/30* (2013.01); *H04L 69/40* (2013.01); *H04W 24/04* (2013.01); *H04W 60/005* (2013.01); *H04W 60/04* (2013.01)

(58) Field of Classification Search
CPC ..... H04W 8/30; H04W 60/005; H04W 60/04; H04W 24/04; H04L 69/40
See application file for complete search history.

(56) References Cited

U.S. PATENT DOCUMENTS

| | | | |
|---|---|---|---|
| 8,391,208 B1 * | 3/2013 | Breau | H04W 60/00 370/328 |
| 10,009,784 B1 * | 6/2018 | Evircan | H04L 41/5009 |
| 2008/0239944 A1 * | 10/2008 | Golla | H04L 43/16 370/216 |
| 2010/0027529 A1 | 2/2010 | Jackson et al. | |
| 2011/0090900 A1 * | 4/2011 | Jackson | H04L 65/1073 370/352 |
| 2016/0112894 A1 * | 4/2016 | Lau | H04L 43/10 370/252 |
| 2018/0260535 A1 * | 9/2018 | Najmi | G06F 9/448 |

OTHER PUBLICATIONS

Session Initiation Protocol, retrieved from https://web.archive.org/web/20191005042218/https://en.wikipedia.org/wiki/Session_Initiation_Protocol, dated Oct. 5, 2019.
Session border controller, retrieved from https://web.archive.org/web/20190911110055/https://en.wikipedia.org/wiki/Session_border_controller, dated Sep. 11, 2019.
Softswitch, retrieved from https://web.archive.org/web/20190820221913/https://en.wikipedia.org/wiki/Softswitch, dated Aug. 20, 2019.

(Continued)

*Primary Examiner* — Jinsong Hu
*Assistant Examiner* — Farideh Madani
(74) *Attorney, Agent, or Firm* — Banner & Witcoff, Ltd.

(57) ABSTRACT

Systems, apparatuses, and methods are described for detecting network service failure and potential source of failure in a communication network employing registration requests. A current quantity of registration requests may be compared against an expected quantity of registration requests, and a network alert may be sent based on the comparison.

31 Claims, 10 Drawing Sheets

(56) References Cited

OTHER PUBLICATIONS

Voice over IP, retrieved from https://web.archive.org/web/20190930213751/https://en.wikipedia.org/wiki/Voice_over_IP, dated Sep. 30, 2019.
IP Multimedia Subsystem, retrieved from https://web.archive.org/web/20190825023712/https://en.wikipedia.org/wiki/IP_Multimedia_Subsystem, dated Aug. 25, 2019.
Access Network, retrieved from https://web.archive.org/web/20171204050220/https://en.wikipedia.org/wiki/Access_network, dated Dec. 4, 2017.
Cable Modem Termination System, retrieved from https://web.archive.org/web/20190825023703/https://en.wikipedia.org/wiki/Cable_modem_termination_system, dated Aug. 25, 2019.

* cited by examiner

NETWORK OUTAGE DETECTION

BACKGROUND

Voice over Internet Protocol (VoIP) technology allows modern communications technologies (including smartphones, voice and video conferencing, emails, etc.) to communicate from a variety of locations. Unfortunately, there may be times when components fail, signals are lost, interference arises, or other problems occur that would degrade the ability to carry on such communications. Early detection of the existence of such problems, and determining a source of the problems, helps to maintain smooth functionality of such communications.

SUMMARY

The following summary presents a simplified summary of certain features. The summary is not an extensive overview and is not intended to identify key or critical elements.

Systems, apparatuses, and methods are described for detecting network service problems in communication networks in which terminals are expected to periodically send registration messages to maintain active status with a registration server. The registration messages may be sent, from the terminal, via an access network, and to the registration server. The quantity of receipt of such registration messages may be monitored between the access network and the registration server, and based on comparing this quantity with an expected quantity that is based on historical values, a potential network problem may be determined. Furthermore, the approximate location of the source of the potential network problem (e.g., whether the problem lies with the access network or with the registration server) may also be determined based on a determination of whether the quantity of receipt lies above or below a range of an expected quantity of registration messages. These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
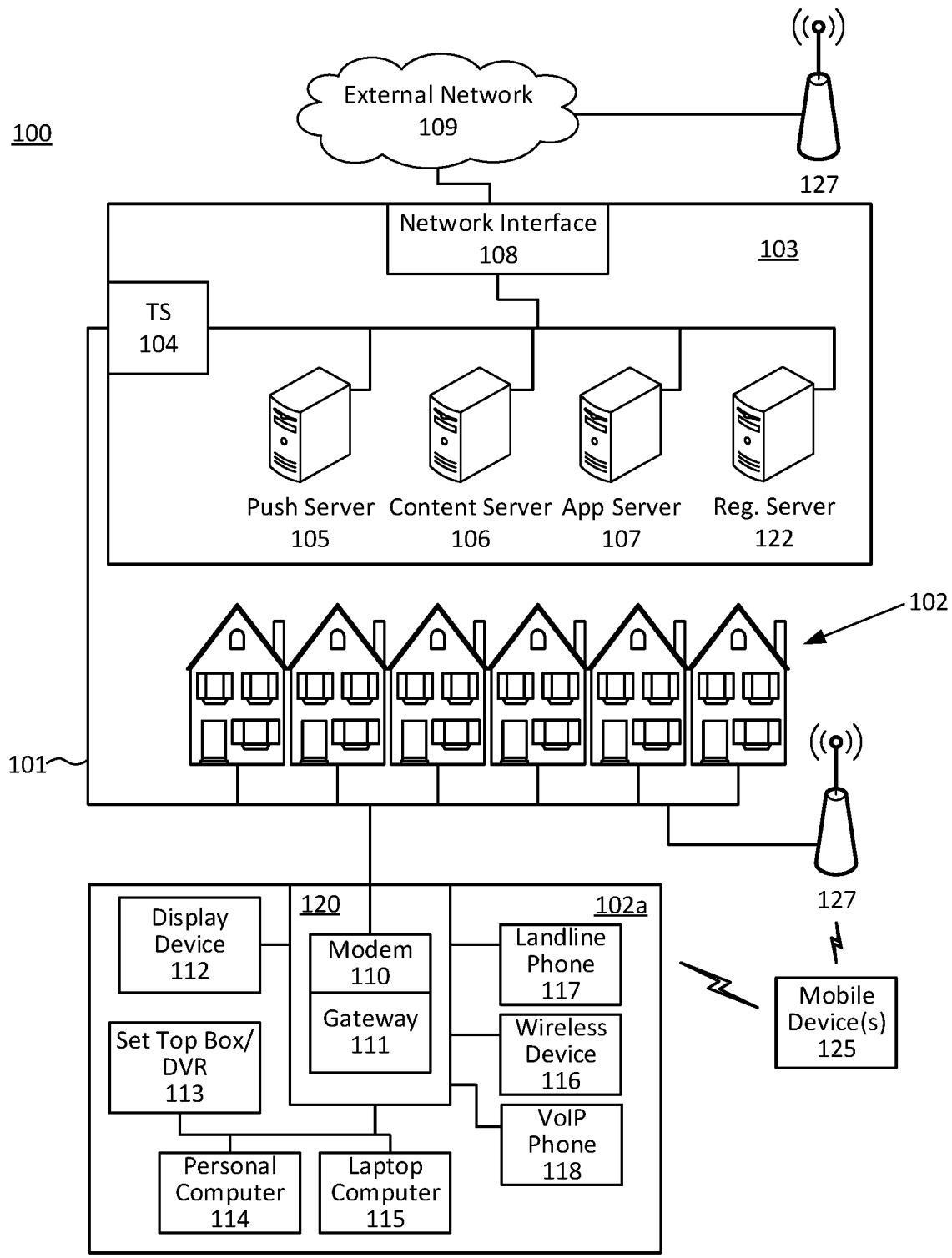
FIG. 1 shows an example communication network on which various features described herein may be implemented.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may comprise one or more information distribution networks of any type, such as, without limitation, a VoIP network, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend and/or its proxies, routers, switches, servers, etc.).

The communication links 101 may comprise various network components, such as hubs, switches, bridges, routers, receivers, transmitters, interfaces, adapters, wireless access points, etc., which are located between the local office 103 and the premises 102. For example, an intervening access network (described later in this disclosure) may comprise the communication links 101 located between the local office 103 and each of the premises 102. The local office 103 may send downstream information signals and receive upstream information signals via the communication links 101. Each of the premises 102 may comprise devices, described below, to receive, send, and/or otherwise process those signals and information contained therein. The local office 103 may be a telecommunication network's core part, which may offer numerous services to customers at the premises 102 via the communication links 101. The local office 103 may direct telephone calls (e.g., VoIP calls) over a public switched telephone network (PSTN) operated by national, regional or local telephone operators.

The communication links 101 may originate from the local office 103 and may comprise components not illustrated, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smartphones, tablets or laptop computers with wireless transceivers, tablets or laptop computers communicatively coupled to other devices with wireless transceivers, and/or any other type of device configured to communicate via a wireless network.

The local office 103 may comprise a push notification server 105, a content server 106, an application server 107 and a communication server, such as a registration server 122. The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. The local office 103 may comprise additional registration servers 122, such as a SIP (Session Initiation Protocol) server (described below), additional push, content, and/or application servers, and/or other types of servers.

The registration server 122 may initiate, maintain, modify, and/or terminate real-time SIP sessions with user terminals (e.g., personal computers 114, laptop computers 115, wireless devices 116, VoIP phones 118, and/or the mobile devices 125). The real-time SIP sessions may involve, e.g., video, voice, messaging and other communication applications and services between two or more endpoints (e.g., registration server 122 and VoIP phone 118) on the communication network 100. The registration server 122 may manage a client-server protocol in text format: a user terminal (e.g., VoIP phone 118) may initiate a registration request and a server (e.g., registration server 122) may respond. The registration server 122 may comprise various servers and/or proxies, collectively called call session control function (CSCF). For example, although not shown in FIG. 1, the SIP server 112 may comprise a proxy-CSCF (P-CSCF), an interrogating-CSCF (I-CSCF) and a serving-CSCF (S-CSCF).

The registration server 122 may also handle registration requests (e.g., SIP messages) from the terminals. The registration server 122 may receive all signaling messages of locally registered terminals, inspect incoming and/or outgoing signals, provide subscriber authentication associated with the terminals, compress and/or decompress registration requests between the local office 103 and the terminals, receive registration requests from the terminals, and forward responses to the registration requests to the terminals.

Although shown separately, the push server 105, the content server 106, the application server 107, the registration server 122, and/or other server(s) may be combined. The servers 105, 106, 107, and 122, and/or other servers, may be computing devices and may comprise memory storing data and also storing computer executable instructions that, when executed by one or more processors, cause the server(s) to perform steps described herein.

The local office 103 may comprise one or more network interfaces 108 that comprise circuitry needed to communicate via the external networks 109. The external networks 109 may comprise networks of Internet devices, telephone networks, wireless networks, wireless networks, fiber optic networks, and/or any other desired network. The local office 103 may also or alternatively communicate with the terminals, e.g. mobile devices 125, via the interface 108 and one or more of the external networks 109, e.g., via one or more of the wireless access points 127.

The local office 103 may comprise a termination system 104 (e.g., a cable modem termination system (CMTS), a session border controller, a network firewall, etc.). The termination system 104 may be a network element between the communication links 101 and the local office 103 to provide service to residential and/or enterprise customers (e.g., in the premises 102). The termination system 104 may control or inspect data flows of sessions comprising call one or more signaling message exchanges, multimedia messages such as a call's audio, video or other data and information of call statistics and quality. At an edge of the local office 103, the termination system 104 may demarcate a backbone network (inside the local office 103) from the rest of the Internet (outside the local office 103). The termination system 104 may assist a network administrator in managing a flow of session data across the termination system 104. The communication links 101 and termination system 104 may comprise an intervening access network, via which a user terminal may send and receive registration messages to and from the registration server (e.g., registration server 122).

VoIP services may be provided for consumers and enterprises based on a combination of the local office 103, the intervening access network and the terminals. Registration requests from the terminals may be failure sensitive. If a terminal fails to receive a positive response from a registration server, this terminal may retry the same server or failover to another server. The terminal may keep re-trying until it receives a confirmation message, and an abnormally high volume of registration requests to the registration server 122 may be indicative of a problem. Accordingly, a communication error alert for a registration server error may be issued. On the other hand, if the registration server 122 receives an abnormally low volume of registration requests, then this may be indicative of a problem in the access network (e.g., the communication links 101, the termination system 104, modem 110, etc.) between the terminal and the registration server 122, as fewer (or no) registration requests are being delivered to the registration server 122. Accordingly, a communication error alert for an access network error may be issued. Further details of proactively detecting VoIP service failure and determining between two potential sources of the failure (e.g., registration server 122 and access network) will be described below with reference to an example premises 102a and FIGS. 3A to 3C.

The example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, e.g., display devices 112 (e.g., televisions), STBs or DVRs 113, the personal computers 114, the laptop computers 115, the wireless devices 116 (e.g., wireless routers, wireless laptops, notebooks, tablets and netbooks, cordless phones (e.g., Digital Enhanced Cordless Telephone-DECT phones), mobile phones, mobile televisions, personal digital assistants (PDA)), the landline phones 117, the VoIP phones 118, and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may comprise wired or wireless connections, as may be appropriate for the type of local network used, and may comprise part of an access network between a communication terminal (e.g., VoIP phone 118, wireless device 116, etc.) and the registration server 122. The access network may comprise any communication media and/or components, wired or wireless, communicatively located between a terminal and the registration server 122.

One or more of the devices at the premises 102a may be configured to provide wireless communications channels (e.g., IEEE 802.11 channels) to communicate with one or more of the mobile devices 125, which may be on- or off-premises. The mobile devices 125, one or more of the devices in the premises 102a, and/or other devices may receive, store, output, and/or otherwise use assets. An asset may comprise a video, a game, one or more images, software, audio, text, webpage(s), and/or other content.

Figure 2:
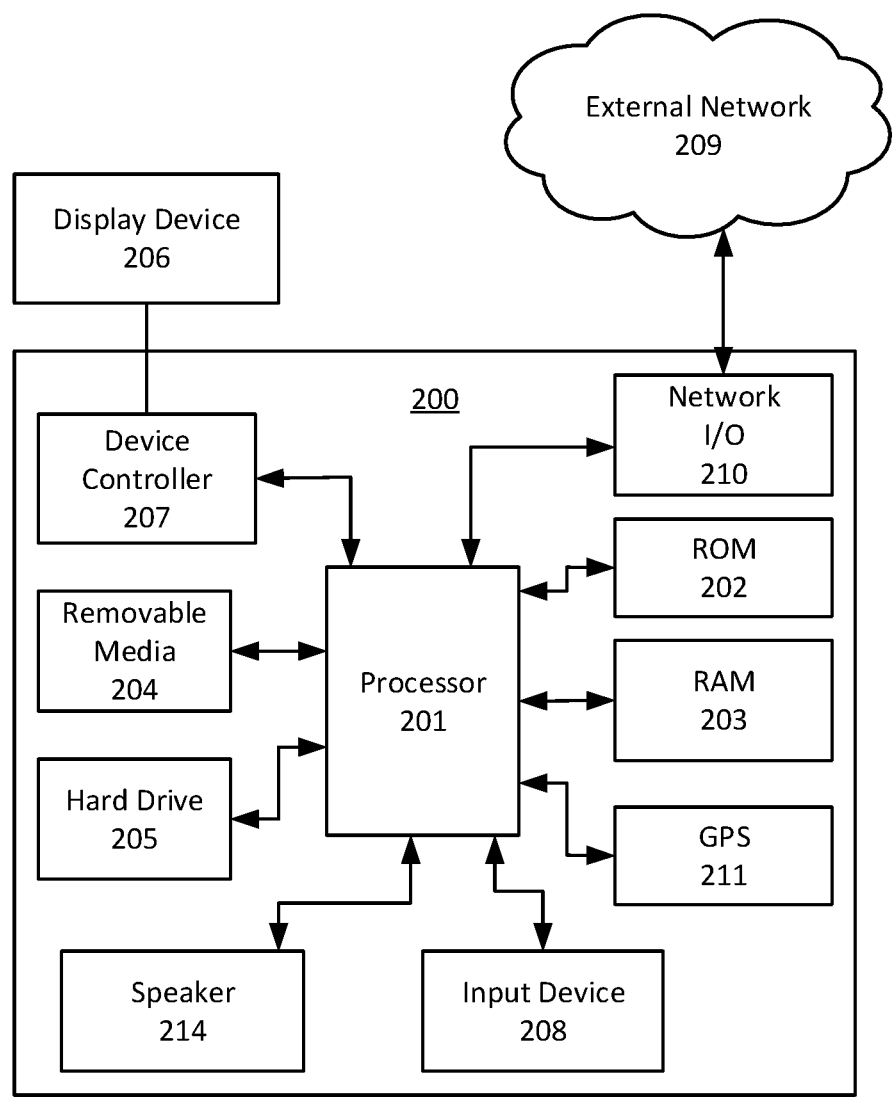
FIG. 2 shows hardware elements of a computing device that may be used to implement the various features described herein.

FIG. 2 shows hardware elements of a computing device 200 that may be used to implement any of the computing devices shown in FIG. 1 (e.g., the various terminals described herein, the mobile devices 125, any of the devices shown in the premises 102a, any of the devices shown in the local office 103, any of the wireless access points 127, any devices with the external network 109) and any other computing devices discussed herein (e.g., network monitoring servers, network failure managers, network analysis servers, etc.). The computing device 200 may comprise one or more processors 201, which may execute instructions of a computer program to perform any of the functions described herein. The instructions may be stored in a read-only memory (ROM) 202, random access memory (RAM) 203, removable media 204 (e.g., a USB drive, a compact disk (CD), a digital versatile disk (DVD)), and/or in any other type of computer-readable medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3A:
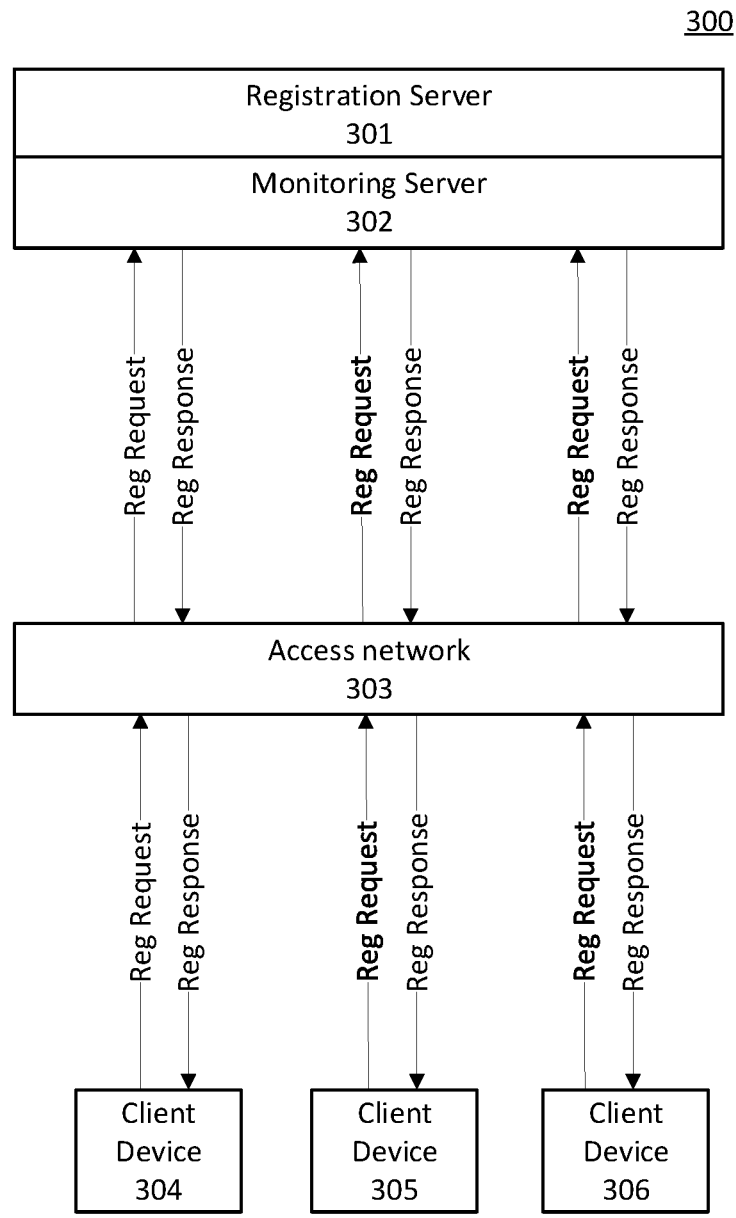
FIGS. 3A to 3C show example registration request operations of a communication network.
Figure 3B:
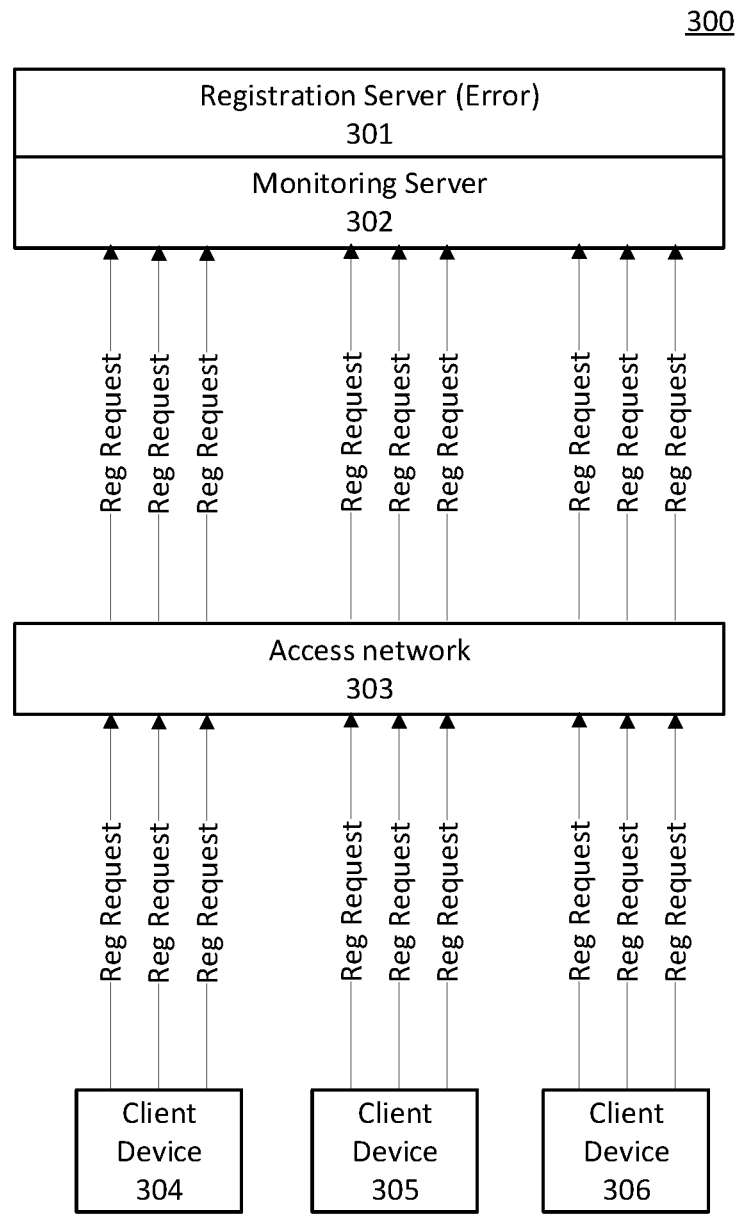
Figure 3C:
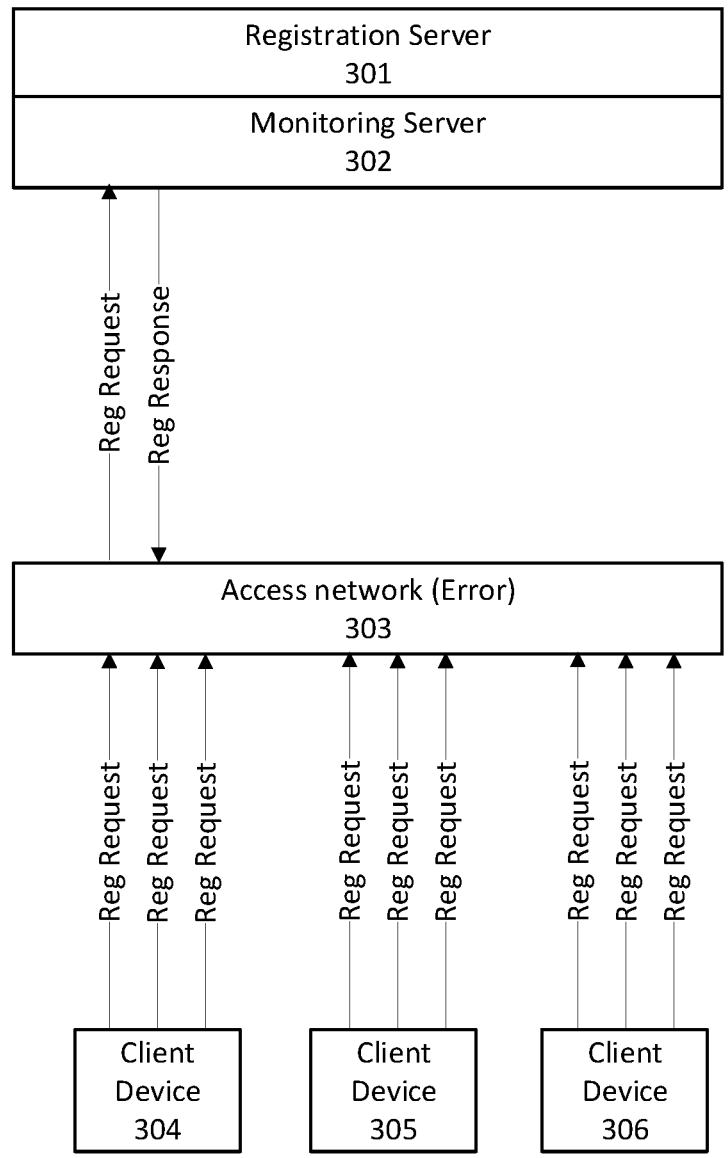

FIGS. 3A to 3C show example operations of a communication network 300, such as a VoIP network. FIG. 3A shows an example normal operation of the network 300, whereas FIGS. 3B & 3C show example abnormal operations of the network 300 if a portion of the network 300 is experiencing or causing a communication error (to be described later in this disclosure).

In FIG. 3A, the network 300 may comprise a registration server 301 (e.g., registration server 122), a monitoring server 302 (which may be implemented as part of registration server 301, application server 107, or any other component shown in FIG. 1), an access network 303 (e.g., communication links 101, termination system 104, modem 110, etc.) and client devices 304-306 (e.g., VoIP phone 118, wireless device 116, personal computer 114, laptop computer 115, landline phone 117, mobile device 125, etc., hereinafter, "terminal"). The registration server 301 (e.g., registration servers 122), the monitoring server 302 and the terminals 304-306 (e.g., personal computers 114, laptop computers 115, wireless devices 116, VoIP phones 118 and/or mobile devices 125) may be numerous in number.

The access network 303 may correspond to, e.g., the access network as previously described in FIG. 1, which may comprise the communication links 101 (e.g., hubs, switches, bridges, routers, receivers, transmitters, interfaces, adapters, wireless access points, etc.) to connect subscribers (e.g., terminals 304-306) to their immediate service providers (e.g., registration server 301). As shown in FIG. 3A, a pair of a registration messages, a registration request and a corresponding response, may be sent on a periodic basis in a repeating registration time window, such as once per hour, to periodically inform the registration server 301 that the terminals 304-306 remain active at an identified location, indicate the nearest cell tower, etc., so that the terminals 304-306 may be reached if an incoming call arrives. The registration time window may repeat on a basis of same time of day, same day of week, or same month of year, etc. For example, a current example instance of a registration time window may be on Friday at 1-2 pm. Prior example instances of the registration time windows may be on every day at 1-2 pm during a previous week. Alternatively, prior example instances of registration time windows may be on all Fridays at 1-2 pm during a previous month. Alternatively, prior example instances of registration time windows may be all one-hour periods during a single past day or week. These example registration time windows may be provided only for exemplary purposes and not limiting.

The registration messages may comprise a registration request sent to the registration server 301 and a registration response received from the registration server 301, and both registration messages may be delivered via the access network 303. The access network 303 may also comprise, e.g., series of wires, cables and equipment lying between a consumer/business telephone termination point at which a telephone connection reaches the customer (e.g., terminals 304-306) and a local telephone exchange that contains banks of automated switching equipment (e.g., registration server 301) which direct a call or connection to the terminals 304-306.

The monitoring server 302 may be implemented at or near the registration server 301, and may observe a flow of registration requests and registration responses in the network 300 arriving at and leaving from the registration server 301. In FIG. 3A, the monitoring server 302 may observe a normal quantity of registration requests and responses, along with a registration time window (e.g., one hour). The terminals 304-306 may be set to send at least one registration request before the registration time window expires. The monitoring server 302 may be located between the registration server 301 and the access network 303, to observe messages in and out of the registration server 301. The monitoring server 302 may generate and/or store registration reports associated with the volume of the registration requests per registration time window. Alternatively, the registration reports may be generated by the terminals (e.g., client devices 304-306) and may be sent to the monitoring server 302, with various registration information such as, e.g., a volume of registration requests per registration time window). The registration reports may be generated after each registration attempt or on a regular time interval (e.g., one second, 30 seconds, 5 minutes, etc.). The registration reports may be used to update a registration history. The registration reports may indicate, e.g., historical quantity of registration, device identifiers (e.g. MAC address), time stamps associated with registration requests, time stamps associated with registration responses, response message codes in the responses, etc. Based on the registration reports, a quantity of registered terminals may be determined. The time stamps associated with registration requests or registration responses may be recorded by the terminals, the registration server 301, the monitoring server 302 or any other servers or proxies in the network 300. The response messages may be detected from the registration reports. The response messages may indicate either success or failure of a single registration attempt to the registration server 301. The monitoring server 302 may report slow or failing components in the network 300 and notify the network administrator, via email, Short Message Service (SMS), dashboard alerts, and/or other alerts, in case of outages or other network issues. Such a communication error alert may be delivered to the network administrator with a carrier-defined security level.

FIG. 3B shows an example abnormal operation of the network 300 (e.g., a VoIP network) if the registration server 301 is defective. As shown in FIG. 3B, if the terminals 304-306 send a first registration request, but does not receive an acknowledgement response, the terminals 304-306 may be configured to send another registration request. If the registration server 301 has experienced a malfunction, then numerous registration requests may be sent from the terminals 304-306 because the terminals 304-306 have not received a positive response from the registration server 301. In this case, the terminals 304-306 may keep resending registration requests, causing a surge in a quantity of the registration requests observed by the monitoring server 302. Alternatively, the terminals 304-306 may failover to another registration server, which may also be in the local office 103, after a timeout is reached and/or a threshold number of registration requests are sent. The surge of the number (e.g., quantity) of the registration requests may be detected and/or stored by the monitoring server 302. Each server/server cluster (e.g., registration server 301, monitoring server 302, access network 303, and terminals 304-306) may comprise its own monitoring tools, logs, dashboards, in order to monitor the server and troubleshoot communication issues. For example, a status of the registration server 301 may be examined by checking a log of an access session border controller (SBC) to see what error messages have been sent in response to a plurality of registration requests from the terminals 304-306, a volume of registration from the terminals 304-306, and/or a distribution of registered terminals among all servers/server clusters, etc. By investigating this data, it may be determined whether a large-scale failover has happened in the network 300.

FIG. 3C shows an example abnormal operation of the network 300 (e.g., a VoIP network) if the access server 303 is experiencing a communication error. As shown in FIG. 3C, an initial registration request may be successfully delivered to the registration server 301, and the registration server 301 sends a response, but the response is not delivered in the access network 303. Alternatively, the initial registration request may not be delivered to the registration server 301, due to an error in the access network 303. In both cases, the terminals 304-306 would not receive a response from the registration server 301, and would issue another registration request. The FIG. 3C example shows many more registration requests being sent, most of which fail to successfully traverse through the access network 303 to the registration server 301, because some or all of the access network 303 is defective and fails to deliver the registration requests to the registration server 301. Even if the terminals 304-306 keeps resending the requests, the requests may not reach the registration server 301, because their route is blocked by a defective portion of the access network 303. This blockage may cause a drop in a number of registration requests observed by the monitoring server 302. The drop in the number of registration requests may be detected and/or stored by the monitoring server 302. A status of the access network 303 may be determined by checking the termination system 104 (e.g., a cable modem termination system (CMTS), a session border controller, a network firewall, etc.) or an edge router service dashboard to see whether any of them is overloaded or close to be overloaded. The status of the access network 303 may also be determined by pinging the terminal 104 (or terminals) located at different network regions to see whether any particular region experiences a network congestion.

Figure 4:
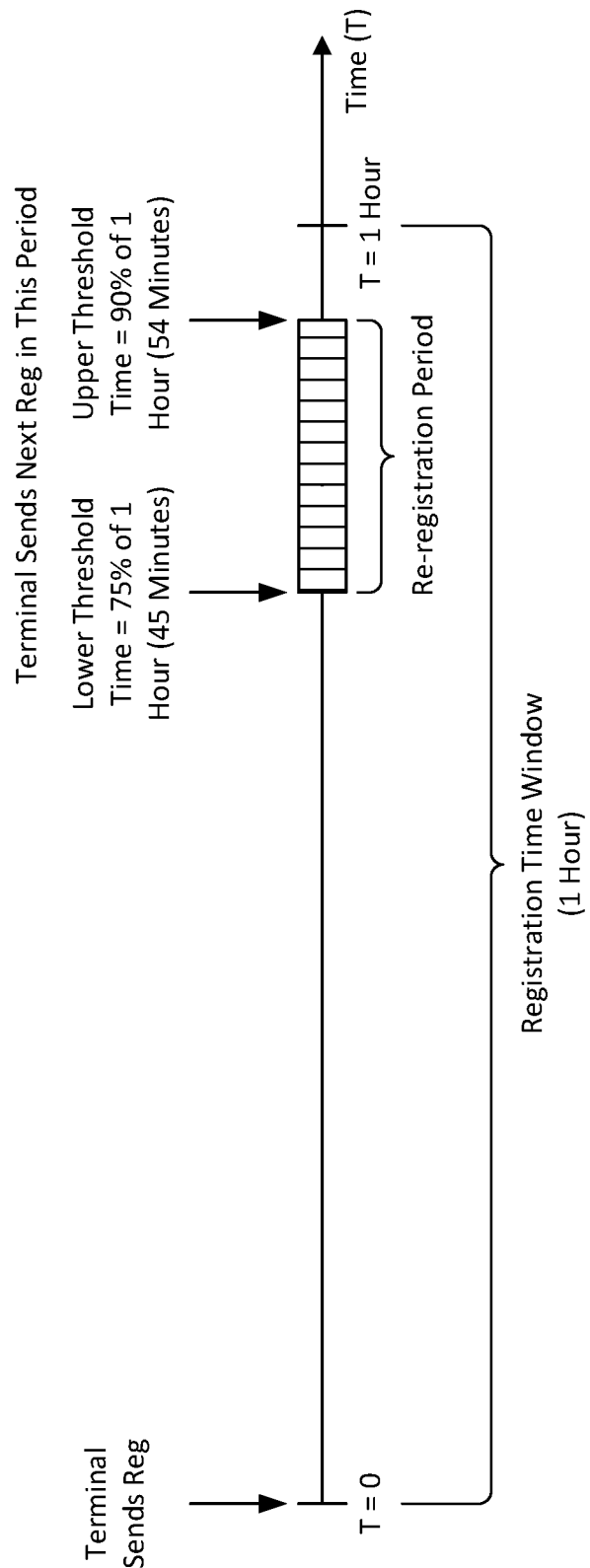
FIG. 4 shows an example timeline for registration requests from terminals.

FIG. 4 shows an example registration timeline associated with the terminal 304. The following discussion may apply to other terminals, such as the terminals 305-306 or other client devices within the network 300. Under normal operating conditions, the terminal 304 may be able to register with the registration server 301 (e.g., in the headend 103) on a regular basis, without network failure or delay. Regardless of making call or not, the terminal 304 may be configured to send at least one registration request to the registration server 301, before each recurring registration time window expires. To help reduce congestion of registration requests received by the registration server 301, the terminal 304 may be configured to transmit its registration request in a re-registration period located before the end of the registration time window (e.g., one hour in FIG. 4). For example, in FIG. 4, a group of terminals may resend registration requests at random time points during the re-registration period (e.g., $T_{re}$ in FIG. 4), to spread or randomize times of registration requests over that re-registration period. A size of the registration time window may be set to any time chosen by the network administrator (e.g., one minute, one hour, three hours, etc.), and the re-registration period may be any portion of that window. As shown in FIG. 4, if the terminal 304 is registered to the registration server 301 at an initial time (T=0), it may resend a registration request to the registration server 301 during a re-registration period ($T_{re}$) and before an expiration of the registration time window (T=1 hour) from that initial time. The re-registration period $T_{re}$ may be ranged from a lower threshold time $T_{low}$ (e.g., 45 minutes (75% of one hour)) to an upper threshold time $T_{up}$ (e.g., 54 minutes (90% of one hour)). The upper threshold time $T_{up}$ may be a beginning time of the re-registration period, and the lower threshold time $T_{low}$ may be an end time of the re-registration period. The terminal 304 may send the registration request to the registration server 301 at any time point during $T_{re}$. Therefore, for a group of the terminals 304 whose registration time window expires at T=1 hour, their registration requests may be randomly distributed over the re-registration period, $T_{re}$. Each of $T_{re}$ (re-registration period), $T_{low}$ (beginning time of re-registration period) and $T_{up}$ (end time of re-registration period) may be adjusted by the network administrator or any other authorities.

A volume of registration requests may be predictable and relatively steady under normal operating conditions, because a group of the terminals 304 may be configured to regularly or periodically send a registration request to the headend 103 (e.g., in FIG. 4), regardless of making call or not. To help determine if a quantity (e.g., number) of registration messages is abnormal, an initial determination may be made to determine an expected quantity of registration requests per registration time window. This expected quantity may be based on a size of the registration time window (e.g., 1 hour in FIG. 4). The expected quantity of the registration requests per registration time window ($N_{exp}$) may be calculated based on a quantity of terminals ($N_{ter}$) that are connected to the registration server 301 via the access network 303, beginning time for re-registration period ($T_{low}$) during the registration time window, and end time for re-registration period ($T_{up}$) during the registration time window, as shown below:

$$N_{exp}=N_{ter}\times \ln(T_{up}/T_{low})\div(T_{up}-T_{low})$$

$N_{exp}$: Expected Quantity of Registration Requests per Registration Time Window
$N_{ter}$: Quantity of Terminals
$T_{up}$: Upper Registration Time (Beginning Time for Re-registration Period)
$T_{low}$: Lower Registration Time (End Time for Re-registration Period)

For example, the network 300 may have 100,000 registered terminals (e.g., $N_{ter}$=100,000) which may be determined based on the registration reports generated/stored by the monitoring server 302 as previously described in FIG. 3A. The registration reports may indicate, e.g., various metadata (e.g., device identifiers, time stamps, user credentials, etc.) associated with the registration requests from the registered terminals. Based on the registration requests from the registered terminals (e.g., once per hour), $N_{ter}$ may be determined. The registration time window may be set to, e.g., one hour, or any other time periods. The terminals 304 may re-register at random time points during $T_{re}$ (e.g., from 45 minutes to 54 minutes as shown in FIG. 4). The expected quantity of registration requests per registration time window ($N_{exp}$) may be the following:

$$N_{exp}=N_{ter}\times \ln(T_{up}/T_{low})\div(T_{up}-T_{low})=100{,}000\times \ln(0.90/0.75)\div(0.90-0.75)=121{,}547 \text{ per hour}$$

In FIG. 4, there may be 121,547 recent registration requests sent from 100,000 terminals to the registration server 301 within one hour. $N_{exp}$ may be compared with a detected quantity of the recent registration requests per registration time window ($N_{det}$). A current (or recent) quantity of recent registration requests, $N_{det}$, may be determined based on, e.g., the registration reports. Example methods for comparing the expected quantity of registration requests, $N_{exp}$, with a currently measured quantity of recent registration requests, $N_{det}$, will be explained in detail with reference to FIG. 5 below.

Figure 5:
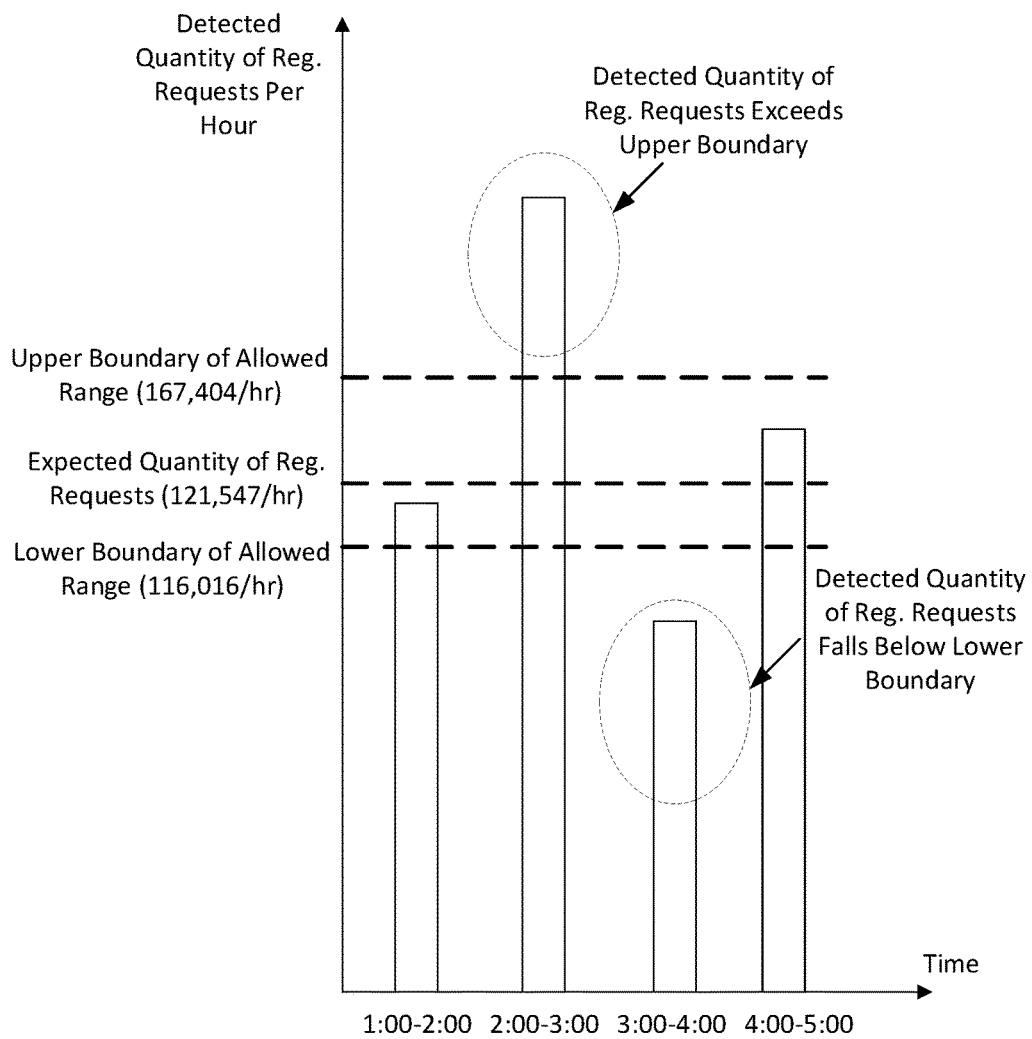
FIG. 5 shows an example chart of a number of registration requests during a registration time window.

FIG. 5 shows an example chart of a historical quantity of registration during a registration time window. The size of the registration time window (e.g., one hour) may be adjusted by the network administrator. This example chart may show a series of $N_{det}$ versus sample registration time windows (e.g., 1-2 pm, 2-3 pm, 3-4 pm and 4-5 pm). $N_{det}$ may be regularly determined and stored in registration history by the monitoring server 302 or other devices in the network 300. In order to check $N_{det}$ in view of $N_{exp}$ (e.g., 121,547/hour, as in FIG. 4), $N_{up}$, an upper boundary (e.g., threshold) for the expected quantity of registration requests ($N_{exp}$), and $N_{low}$, a lower boundary (e.g., threshold) for the expected quantity of registration requests ($N_{exp}$), may be determined based on the registration history (to be described below). Based on the upper and lower boundaries ($N_{up}$ and $N_{low}$), an allowed range for the detected quantity of registration requests per registration time window ($N_{det}$) may be determined. For example, if a currently measured quantity of recent registration requests, $N_{det}$, exceeds an upper boundary of the allowed range, $N_{up}$ (e.g., due to a defective registration server as in FIG. 3B) or falls below an lower boundary of the allowed range, $N_{low}$ (e.g., due to a defective access network as in FIG. 3C), the network 300 may be considered abnormal and a communication error alert indicating a potential source of a network failure may be sent to the network administrator. The alert may comprise, e.g., a plurality of time stamps associated with registration requests received during an observation window (e.g., registration time window) in which the alert has been triggered, an expected range of a quantity of registration requests during the observation window (e.g., $N_{exp}$), and/or an actual quantity of registration requests detected during the observation window (e.g., $N_{det}$).

The expected quantity of registration requests may comprise a range above and below the quantity $N_{exp}$ discussed above. The upper and lower boundaries of this allowed range ($N_{up}$ and $N_{low}$) may be determined based on one or more historical quantities of $N_{det}$ stored in the registration history. It may be checked how much $N_{det}$ is deviated from $N_{exp}$ over retrieved registration history. A historical deviation (D) between one or more historical quantities of $N_{det}$ and the expected quantity of registration requests per registration time window ($N_{exp}$) may be calculated by the following formula:

$$\text{Historical Deviation}(D) = |N_{det} - N_{exp}|$$

To calculate a historical deviation D, a subset of the registration history may be retrieved (e.g., historical values of $N_{det}$ for last 5 days). A subset of the registration history (e.g., historical quantity of registration during same day of week for past one month, same time of day for past 5 days, all one-hour periods for past 3 days, etc.) may be designated and retrieved. The subset of the registration history may be used to calculate the historical deviation D, based on the expected quantity of registration requests $N_{exp}$. The subset may be changed by the network administrator or other authorities. The subset may be updated per each registration time window, or may be maintained until a request to change the subset of the registration history is received from the network administrator. In this disclosure, $N_{exp}$ may be 121,547 per hour as described in FIG. 4, and $N_{exp}$ may remain steady according to the formula: $N_{exp} = N_{ter} \times \ln(T_{up}/T_{low}) \div (T_{up} - T_{low})$.

Various historical deviations may be employed to determine the allowed range for $N_{det}$. A maximum historical deviation associated with $N_{det}$ ($D_{max}$) and a minimum historical deviation associated with $N_{det}$ ($D_{min}$) during the last 5 days may be selected by the monitoring server 302. The maximum and minimum historical deviations ($D_{max}$ and $D_{min}$) may be employed to determine an upper threshold for the allowed range ($Th_{up}$) and a lower threshold for the allowed range ($Th_{low}$). In FIG. 5, the maximum and minimum historical deviations ($D_{max}$ and $D_{min}$) and the upper and lower thresholds for the allowed range ($Th_{up}$ and $Th_{low}$) may be determined based on predetermined values of historical quantity of registration requests ($N_{det}$), expected quantity of registration requests ($N_{exp}$), and constants $K_1$ and $K_2$ (e.g., $K_1$ and $K_2$ may be 1.10 in FIG. 5; these constants may be adjusted), as shown below:

$$D_{max} = |N_{det} - N_{exp}| = 163{,}235 - 121{,}547 = 41{,}688 \text{ per hour}$$

$$Th_{up} = K_1 \times D_{max} = 1.1 \times 41{,}688 = 45{,}857 \text{ per hour}$$

$$D_{min} = |N_{det} - N_{exp}| = 132{,}478 - 127{,}450 = 5{,}028 \text{ per hour}$$

$$Th_{low} = K_2 \times D_{min} = 1.1 \times 5{,}028 = 5{,}531 \text{ per hour}$$

Based on the expected quantity of registration requests ($N_{exp}$) and the upper and lower thresholds ($Th_{up}$ and $Th_{low}$) for the allowed range, the upper and lower boundaries ($N_{up}$ and $N_{low}$) of the allowed range for the quantity of registration requests per registration time window ($N_{det}$) may be determined. The allowed range may be defined as a numerical range from $N_{up}$ to $N_{low}$, as shown in FIG. 5. The expected quantity of registration requests ($N_{exp}$) may be surrounded by the allowed range and the upper and lower boundaries ($N_{up}$ and $N_{low}$) are calculated by the following formula:

$$N_{up} = N_{exp} + Th_{up} = 121{,}547 + 45{,}857 = 167{,}404 \text{ per hour}$$

$$N_{low} = N_{exp} - Th_{low} = 121{,}547 - 5{,}531 = 116{,}016 \text{ per hour}$$

In FIG. 5, a network alert may be triggered if the detected quantity of the registration requests per registration time window ($N_{det}$) exceeds the upper boundary ($N_{up}$) (e.g., 167,404 per hour) or falls below the lower boundary ($N_{low}$) (e.g., 116,016 per hour). This unusually low or high volume of the registration requests may be caused by network issues associated with any component on a route from the terminals to the registration server 301 (e.g., coaxial cables, optical fibers, wireless links, hubs, firewalls, routers, switches, servers, proxies, wireless access points, receivers, transmitters, interfaces, adapters, anti-malware systems, etc.). If $N_{det}$ is out of the allowed range in FIG. 5, an alert may be triggered. The monitoring server 302 or the push notification server 105 may send the alert to users or the network administrator, to notify occurrence of network failure and/or potential source of failure, as previously described. Two potential sources of network failure may comprise the registration server 301 and the access network 303. The monitoring server 302 may be configured to send alerts to a first destination if the quantity of current registration requests exceeds the upper boundary ($N_{up}$), and to a second destination if the quantity of current registration requests falls below the lower boundary ($N_{low}$). The expected ranges and values discussed above are merely examples, and alternative formulations of the permissible ranges may be used as desired. Different values may be used for different geographic locations, different times of day, etc., as desired.

In FIG. 5, during the time window 2-3 pm, $N_{det}$ (e.g., 184,329 per hour) may exceed the upper boundary ($N_{up}$) (e.g., 167,404 per hour). This unusual surge of $N_{det}$ may be caused by the defective registration server 301, as previously described in FIG. 3B. Thus, a communication error alert may be sent by the monitoring server 302 to alert a registration server error. On the other hand, during the time window 3-4 pm, $N_{det}$ (e.g., 73,408 per hour) may fall below the lower boundary ($N_{low}$) (e.g., 116,016 per hour). This unusual drop of $N_{det}$ may be caused by the defective access network 303, as previously described in FIG. 3C. Thus, an alert (e.g., an e-mail or other electronic message, phone call, audible alarm, etc.) may be sent by the monitoring server 302 to alert an access server error or terminal error. If $N_{det}$ remains within the allowed range, such as in the time windows 1-2 pm and 4-5 pm, no alert may be sent by the monitoring server 302. Detailed methods for triggering an alert and locating potential source of network failure will be described below.

Figure 6A:
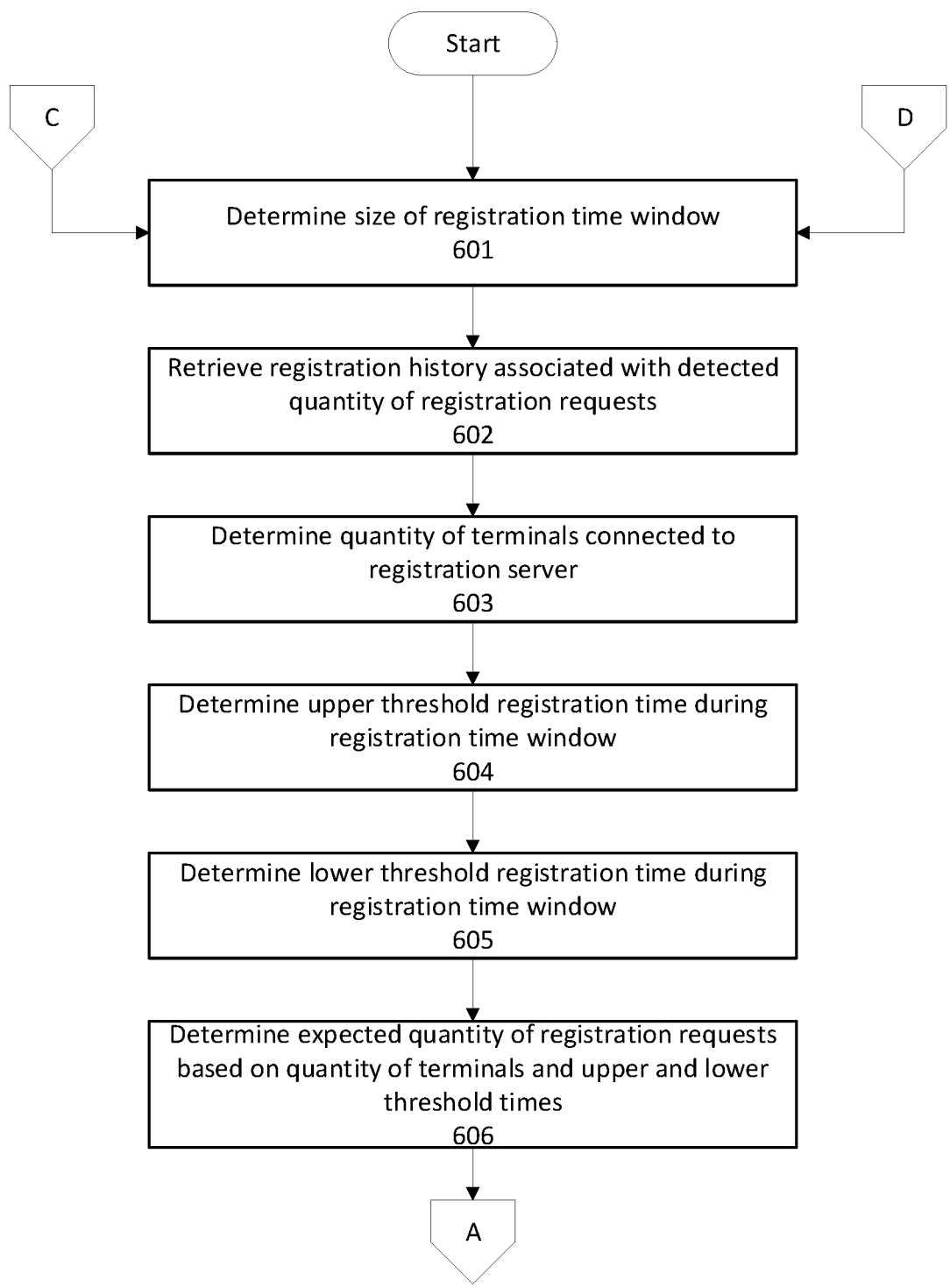
FIGS. 6A to 6C show flow charts showing an example method for determining which part of a communication network may be a source of a communication error.
Figure 6B:
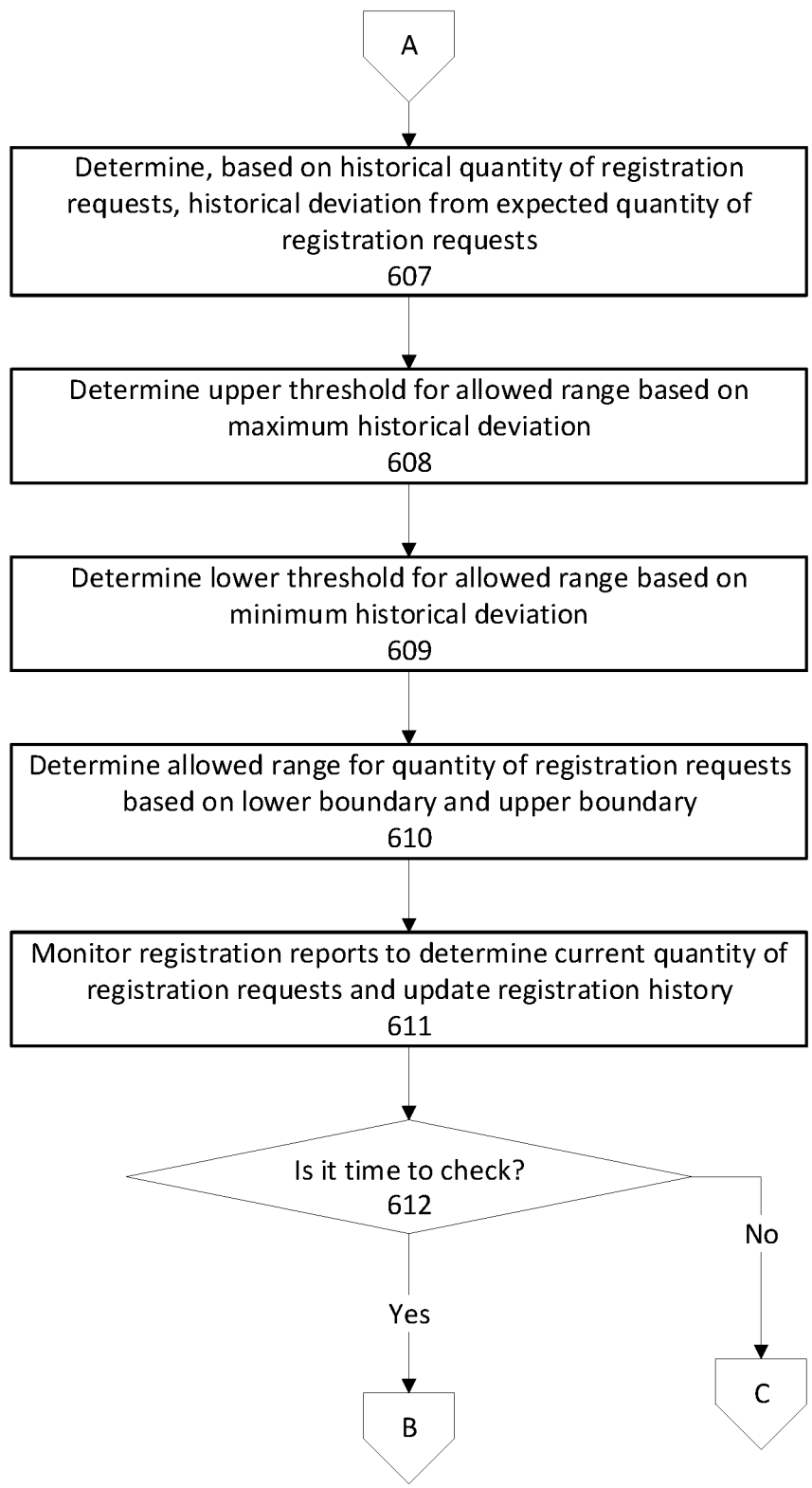
Figure 6C:
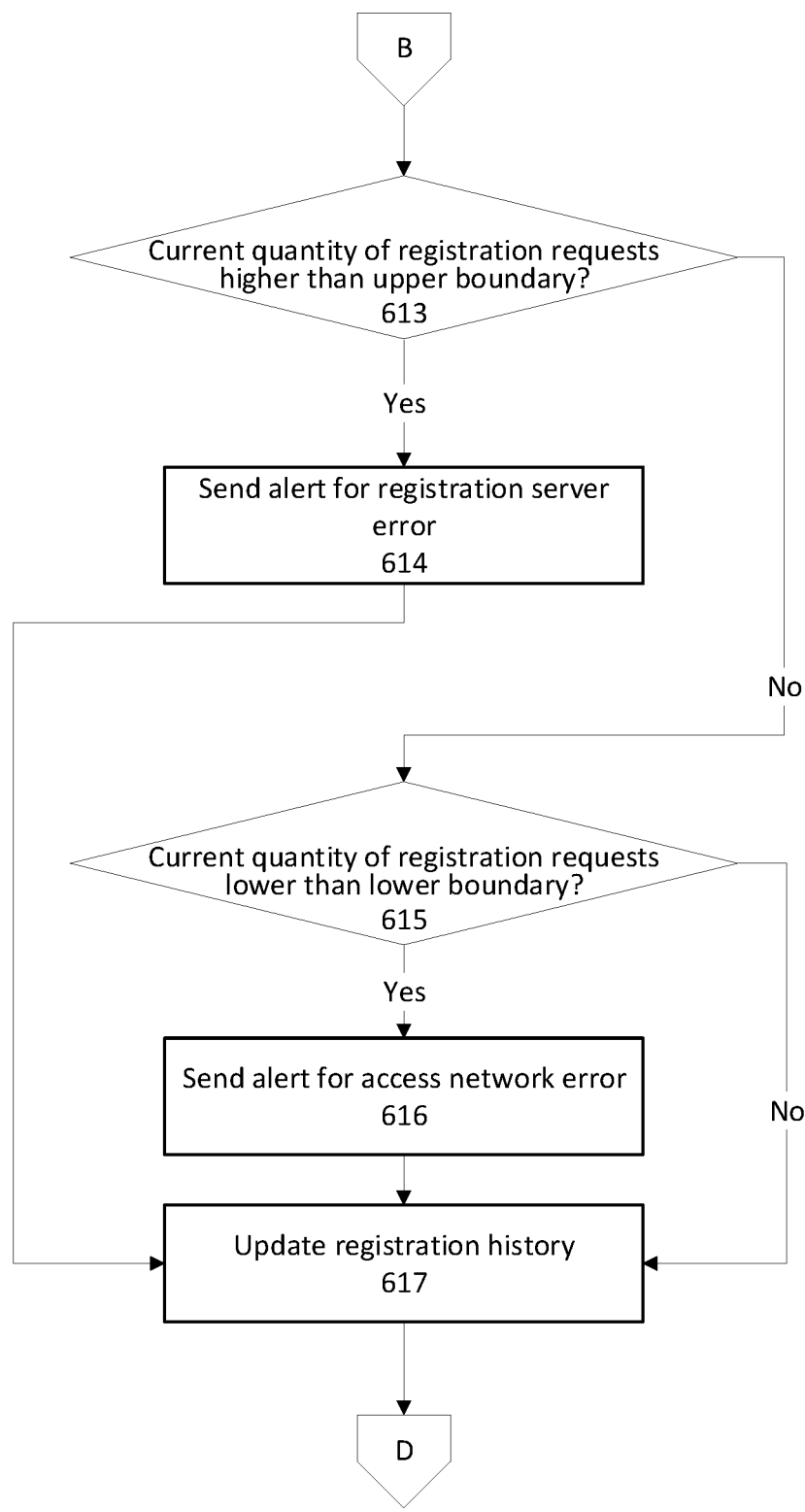

FIGS. 6A to 6C comprise a flow chart showing an example method for determining whether the detected quantity of the registration requests ($N_{det}$) is abnormal in view of the expected number of the registration requests ($N_{exp}$), with reference to FIGS. 1 to 5. The monitoring server 302 (or whichever computing device is performing the algorithm) may be configured. For example, a plurality of communications between the monitoring server 302 and various components in the network 300 may be set up, via the communication links 101 in FIG. 1. The monitoring server 302 may be connected with any hardware, software and other supporting devices and components at the network 300. This configuration process may involve setting the monitoring server's 302 controls, flow and operation to support communications between the monitoring server 302 and the registration server 301, the access network 303 and/or the terminals 304-306 (e.g., personal computers 114, laptop computers 115, wireless devices 116, landline phones 117, VoIP phones 118, mobile devices 125 or any other Internet access devices).

In FIG. 6A, at step 601, the size of the registration time window (e.g., 5 minutes, 30 minutes, one hour, etc.) may be determined as in FIG. 4. The size of the registration time window may be set and/or changed by the network administrator. Based on the registration time window, at step 602, the registration history associated with the historical volume of $N_{det}$ may be retrieved from the monitoring server 302, the content server 106, the registration server 122 or any other database or server in the network 300 that retains the registration request history. As previously described in FIG. 5, the registration history may comprise, e.g., the historical volume of registration requests per registration time window ($N_{det}$) (e.g., $N_{det}$ for last 5 days or for each of the same day of week for 5 weeks), and may be updated as new registration requests are received by the registration server 301 and/or detected by the monitoring server 302. For example, if the current time is Friday at 3 pm, $N_{det}$ during 2-3 pm on Monday to Thursday may be retrieved from the registration history. Alternatively, $N_{det}$ within a time window 2-3 pm on each Friday for last 4 weeks may be retrieved from the registration history. Of course, other timing schemes for retrieving $N_{det}$ from the registration history may be implemented.

At step 603, the quantity of the terminals 304-306 ($N_{ter}$) connected to the registration server 301 may be determined based on the registration reports generated by the monitoring server 302. Alternatively, $N_{ter}$ may be determined based on communications between the monitoring server 302 and the terminals 304-306 at any time before step 603. $N_{ter}$ may be 100,000, as previously described in FIG. 4. At steps 604 and 605, the upper threshold for registration time ($T_{up}$) and the lower threshold for registration time ($T_{low}$) may be determined. In FIG. 4, for example, $T_{low}$ may be 75% of one hour (45 minutes) and $T_{up}$ may be 90% of one hour (54 minutes). At step 606, as previously described in FIG. 4, $N_{exp}$ may be determined based on the foregoing values of $N_{ter}$, $T_{up}$ and $T_{low}$, such as the following:

$$N_{exp} = N_{ter} \times \ln(T_{up}/T_{low}) \div (T_{up}-T_{low}) = 100{,}000 \times \ln(0.90/0.75) \div (0.90-0.75) = 121{,}547 \text{ per hour}$$

In FIG. 6B, at step 607, the historical deviation D (e.g., $D = |N_{det} - N_{exp}|$, as in FIG. 5) may be determined based on the registration history. The following steps 607 to 610 may be performed to determine whether a current value of $N_{det}$ is out of the allowed range, with reference to FIG. 5. At step 607, a portion of the registration history may be retrieved and the historical deviation (D) may be calculated based on $N_{det}$ (e.g., $N_{det}$ for last 5 days) and $N_{exp}$ (e.g., 121,547 per hour). The maximum and minimum values of D ($D_{max}$ and $D_{min}$) may be determined from the historical values of D.

At step 608, the upper threshold ($Th_{up}$) for the allowed range for the quantity of registration requests per registration time window may be determined. For example, as in FIG. 5, $Th_{up}$ may be calculated, e.g., as the following: $Th_{up} = K_1 \times D_{max} = 1.1 \times 41{,}688 = 45{,}857$ per hour ($K_1$ may be an adjustable constant). At step 609, the lower threshold ($Th_{low}$) for the allowed range for the quantity of registration requests per registration time window may be determined. For example, as in FIG. 5, $Th_{low}$ may be calculated, e.g., as the following: $Th_{low} = K_2 \times D_{min} = 1.1 \times 5{,}028 = 5{,}531$ per hour ($K_2$ may be an adjustable constant).

The constants $K_1$ and $K_2$ that are used to calculate the upper and lower thresholds ($Th_{up}$ and $Th_{low}$) may be adjusted, depending on a desired frequency of alert triggering in the network 300. For example, $K_1$ and $K_2$ may be increased to enlarge the allowed range if a lower amount of alert triggering is desired ($N_{det}$ is more likely to be within the allowed range), whereas $K_1$ and $K_2$ may be decreased to shrink the allowed range if a higher amount of alert triggering is desired ($N_{det}$ is more likely to be out of the allowed range). An optimal allowed range for a detected quantity of the recent registration requests per registration time window ($N_{det}$) may be determined based on a selection of $K_1$ and $K_2$, to avoid false alerts and misdetection of network errors. $K_1$ and $K_2$ may be determined via an analysis of historical data associated with registration (e.g., how $N_{det}$ has changed over a given time period, how much $N_{det}$ exceeds or falls below an expected quantity of the recent registration requests ($N_{exp}$), etc.). The values of $K_1$ and $K_2$ may be obtained and/or updated based on such a training process via example computer software, hardware, algorithm and/or applications implemented on user devices (e.g., VoIP phone 118, laptop computer 115, personal computer 114, mobile devices 125, etc.).

At step 610, based on the expected quantity of the recent registration requests ($N_{exp}$) and the upper and lower thresholds for the allowed range ($Th_{up}$ and $Th_{low}$), the allowed range for the detected quantity of the recent registration requests per registration time window ($N_{det}$) may be determined. As previously described in FIG. 5, the lower boundary ($N_{low}$) for the allowed range may be calculated, e.g., as the following: $N_{low} = N_{exp} - Th_{low} = 121{,}547 - 5{,}531 = 116{,}016$ per hour. Also, the upper boundary ($N_{up}$) for the allowed range may be calculated, e.g., as the following: $N_{up} = N_{exp} + Th_{up} = 121{,}547 + 45{,}857 = 167{,}404$ per hour. The allowed range may range from $N_{low}$ (e.g., 116,016 per hour) to $N_{up}$ (e.g., 167,404 per hour), as previously shown in FIG. 5. The allowed range may be compared with the current quantity of registration requests per registration time window ($N_{det}$), to determine whether to trigger an alert to notify a network failure. At step 611, the current quantity of registration requests ($N_{det}$) may be determined based on the registration reports generated by the monitoring server 302 (as previously determined in FIG. 3A), and $N_{det}$ may be recorded in the registration history. The registration history may be stored in the monitoring server 302 or any memory (e.g., ROM 202, RAM 203, etc.), servers (e.g., servers 105-107 and 122, etc.) or the external network 209.

At step 612, it may be determined whether it is a predetermined time (e.g., every 30 seconds, 1 minute, 1 hour, etc.) to check whether the current quantity of registration requests ($N_{det}$) (which is the detected number of registration requests per registration time window, as shown in FIG. 5) is out of the allowed range from the lower boundary ($N_{low}$) to the upper boundary ($N_{up}$). The system need not perform the check continuously, but if desired, the predetermined time may be set to zero or omitted to allow for continuous checking. If it is not time to check (e.g., step 613: no), the monitoring server 302 may proceed to step 601 of FIG. 6A, and the foregoing process of whether $N_{det}$ is out of the allowed range may be renewed. If it is the time to check (e.g., step 613: yes), the process may proceed to step 613 of FIG. 6C.

In FIG. 6C, at step 613, it may be determined whether the current quantity of registration requests ($N_{det}$) is higher than (e.g., exceeds or satisfies) the upper boundary ($N_{up}$) (which is the upper threshold for $N_{det}$, as determined in step 610). If $N_{det}$ exceeds $N_{up}$ (e.g., step 613: yes or during the time window 2-3 pm in FIG. 5), the monitoring server 302 may proceed to step 614. At step 614, an alert to notify an error with the registration server 301 may be sent to the network administrator or other authorities. As previously described in FIG. 3B, some repeated registration requests may be sent to the defective registration server 301 (e.g., in FIG. 3B) if the registration server 301 does not respond to the requests from the terminals 304-306. Due to the repeated requests, $N_{det}$ may be abnormally high, as determined by the monitoring server 302. The alert may indicate that the registration server 301 (e.g., registration servers and/or proxies in the headend 103) may be experiencing an error, along with time of the registration server error. Then the monitoring server 302 may proceed to step 618 (to be described later in this disclosure). If the current quantity of registration requests ($N_{det}$) is not higher than the upper boundary ($N_{up}$) (e.g., step 614: no or during the time windows 1-2 pm and 4-5 pm in FIG. 5), the monitoring server 302 may proceed to step 615 (to be described below).

At step 615, it may be determined whether the current quantity of registration requests ($N_{det}$) is lower than the lower boundary ($N_{low}$) (which is the lower threshold for $N_{det}$, as determined in step 610). If $N_{det}$ falls below $N_{low}$ (e.g., step 615: yes or during the time window 3-4 pm in FIG. 5), the monitoring server 302 may proceed to step 616. At step 616, an alert to notify an error with the access server 303 or the terminals 304-306 may be sent to the network administrator or other authorities. As previously described in FIG. 3C, some repeated registration requests may be sent to the defective access server 303 (e.g., in FIG. 3C) if the access server 303 does not respond to the requests from the terminals 304-306. Due to a defect in the access network 303, a relatively small portion of the requests, if not none, may be delivered to the registration server 301. $N_{det}$ may be abnormally low, as determined by the monitoring server 302. The alert may indicate that the access server 303 or some of the terminals 304-306 may be experiencing an error, along with time of the access server/terminal error. If one or more of the terminals 304-306 have a network issue, they may not be able to generate and/or send the registration requests. If the current quantity of registration requests ($N_{det}$) is not lower than the lower boundary ($N_{low}$) (e.g., step 615: no or during the time windows 1-2 pm and 4-5 pm in FIG. 5), the monitoring server 302 may proceed to step 617.

At step 617, the registration history may be updated. A variety of numerical values (e.g., detected quantity of registration requests ($N_{det}$), expected quantity of registration requests ($N_{exp}$), upper and lower boundaries ($N_{up}$ and $N_{low}$), quantity of registered terminals ($N_{ter}$), upper and lower thresholds ($Th_{up}$ and $Th_{low}$), etc.) may be stored and/or updated in the registration history. The recorded values may be used for future registration requests. For example, $N_{det}$ may be regularly retrieved from the registration history which is determined by a flow of registration reports (e.g., including time stamps associated with registration requests and response messages, etc.). Then the monitoring server 302 may proceed to step 601, where the monitoring server 302 may renew a loop for determining whether another current value of $N_{det}$ is out of the allowed range and whether to send out an alert for network error.

At steps 614 & 616, based on determining that $N_{det}$ is out of the allowed range in FIG. 5 (e.g., step 613: yes or step 615: yes), a network capacity plan may be redesigned to accommodate a new capacity as required by the VoIP service or registration (in addition, or alternatively to, sending the alerts). The network capacity plan may be done to identify shortcomings or parameters that can affect the network's performance or availability within a predictable future time. For example, based on $N_{det}$ as previously described, a current registration traffic volume may be estimated. The expected range/thresholds associated with the detected quantity of registration requests ($N_{det}$) may be adjusted to accommodate the current registration traffic volume and to reduce false error alerts. The newly decided expected range/thresholds may be stored and/or implemented by the monitoring server 302. The network capacity plan may be regularly updated per registration time window.

If the quantity of current registration requests is within the expected range, under normal operating conditions such as the registration time windows of 1-2 pm and 4-5 pm in FIG. 5, the monitoring server 302 may not send out an alert, as previously described. At step 617, the registration history may be updated as previously described. It may be reasonably assumed that the terminals 304-306 have been registered to the local office 103 and received successful response messages, as previously described in FIG. 3A.

After step 617, the monitoring server 302 may proceed to step 601 and repeat the foregoing process. If an alert has been sent in step 614 or 616 (e.g., a network issue found), the size of the registration time window may be reduced to tighten a search for a change in the detected number of registration requests per each registration time window ($N_{det}$). Alternatively, the size of the registration time window may be enlarged to save processing power associated with the monitoring server 302. Alternatively, the monitoring server 302 may skip step 601 and proceed to step 602, and so the size of the registration time window may remain unchanged for the next processing loop (e.g., as described in FIGS. 6A to 6C.)

Based on registration monitoring algorithm, the detected number of registration requests per registration time window ($N_{det}$) and the expected number of registration requests ($N_{exp}$) may be compared automatically, and an alert may be sent if $N_{det}$ is out of the allowed range in FIG. 5. Thus, a proactive detection of occurrence, timing and/or potential source of network failure (e.g., caused by the registration server 301, the access network 303 and/or the terminals 304-306) may be performed without a manual control over the monitoring server 302 or any other computing devices in the network 300 by the network administrator or other authorities. Based on a network or call flow design previously described in this disclosure, each network service carrier may determine its own network health check sequence, if a communication error alert (e.g., registration error alert) is triggered.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
   determining, by a computing device and for a plurality of repeating time intervals, a quantity of registration requests received by a server during each of the repeating time intervals;
   determining, based on the quantity of registration requests received by the server during each of the repeating time intervals, an expected quantity of registration requests received by the server;
   retrieving, for a recent repeating time interval, a quantity of recent registration requests received by the server;
   determining a source of an error based on determining whether the quantity of recent registration requests satisfies a first threshold or a second threshold of the expected quantity of registration requests, wherein the quantity of recent registration requests satisfying the first threshold is associated with a first source of error and the quantity of recent registration requests satisfying the second threshold is associated with a second source of error; and
   sending a network alert indicating the determined source of the error.

2. The method of claim 1, wherein the determining the expected quantity of registration requests comprises determining a historical quantity of registration requests received by the server.

3. The method of claim 1, wherein the first threshold and the second threshold of the expected quantity of registration requests are based on a historical quantity of registration requests received by the server.

4. The method of claim 1, wherein the first threshold is an upper boundary of the expected quantity of registration requests and the second threshold is a lower boundary of the expected quantity of registration requests.

5. The method of claim 1, further comprising:
 storing a registration history comprising a historical quantity of registration requests received by the server; and
 determining, based on the registration history, the first threshold and the second threshold of the expected quantity of registration requests.

6. The method of claim 1, wherein the determining the expected quantity of registration requests comprises:
 determining, based on a time associated with the recent registration requests, a subset of registration requests received by the server; and
 determining, based on the subset and the quantity of registration requests received by the server during each of the repeating time intervals, the expected quantity of registration requests.

7. The method of claim 1, wherein the determining the expected quantity of registration requests comprises determining, based on a re-registration period within one of the plurality of repeating time intervals, the expected quantity of registration requests received by the server.

8. The method of claim 1, wherein the determining the expected quantity of registration requests comprises determining, based on an upper boundary and a lower boundary of a re-registration period within one of the plurality of repeating time intervals, the expected quantity of registration requests received by the server.

9. The method of claim 1, wherein the determining the quantity of registration requests received by a server during each of the repeating time intervals comprises determining the quantity of registration requests received by the server via a Voice over Internet Protocol (VoIP) network.

10. The method of claim 1, wherein the determining the expected quantity of registration requests comprises determining, based on (1) a quantity of terminals registered with a network associated with the server and (2) a ratio between an upper boundary and a lower boundary of a re-registration period within one of the plurality of repeating time intervals, the expected quantity of registration requests.

11. The method of claim 1, wherein based on the quantity of recent registration requests being greater than the first threshold of the expected quantity of registration requests, the determined source of the error is determined to be the server.

12. The method of claim 1, wherein based on the quantity of recent registration requests being less than the second threshold of the expected quantity of registration requests, the determined source of the error is determined to be an intervening access network via which the registration requests are received by the server.

13. The method of claim 1, further comprising:
 storing information associating the first threshold with a first source of an error and associating the second threshold with a second source of an error, wherein the determining the source of the error comprises selecting, based on whether the quantity of recent registration requests satisfies the first threshold or the second threshold, between the first source and the second source.

14. An apparatus comprising:
 one or more processors; and
 memory storing instructions that, when executed by the one or more processors, cause the apparatus to:
  determine, for a plurality of repeating time intervals, a quantity of registration requests received by a server during each of the repeating time intervals;
  determine, based on the quantity of registration requests received by the server during each of the repeating time intervals, an expected quantity of registration requests received by the server;
  retrieve, for a recent repeating time interval, a quantity of recent registration requests received by the server;
  determine a source of an error based on determining whether the quantity of recent registration requests satisfies a first threshold or a second threshold of the expected quantity of registration requests, wherein the quantity of recent registration requests satisfying the first threshold is associated with a first source of error and the quantity of recent registration requests satisfying the second threshold is associated with a second source of error; and
  send a network alert indicating the determined source of the error.

15. The apparatus of claim 14, wherein the instructions, when executed by the one or more processors, cause the apparatus to:
 determine the expected quantity of registration requests by determining a historical quantity of registration requests received by the server.

16. The apparatus of claim 14, wherein the first threshold and the second threshold of the expected quantity of registration requests are based on a historical quantity of registration requests received by the server.

17. The apparatus of claim 14, wherein the first threshold is an upper boundary of the expected quantity of registration requests and the second threshold is a lower boundary of the expected quantity of registration requests.

18. The apparatus of claim 14, wherein the instructions, when executed by the one or more processors, cause the apparatus to:
 store a registration history comprising a historical quantity of registration requests received by the server; and
 determine, based on the registration history, the first threshold and the second threshold of the expected quantity of registration requests.

19. The apparatus of claim 14, wherein the instructions, when executed by the one or more processors, cause the apparatus to determine the expected quantity of registration requests by:
 determining, based on a time associated with the recent registration requests, a subset of registration requests received by the server; and
 determining, based on the subset and the quantity of registration requests received by the server during each of the repeating time intervals, the expected quantity of registration requests.

20. The apparatus of claim 14, wherein the instructions, when executed by the one or more processors, cause the apparatus to:
 determine the expected quantity of registration requests by determining, based on a re-registration period within one of the plurality of repeating time intervals, the expected quantity of registration requests received by the server.

21. The apparatus of claim 14, wherein the instructions, when executed by the one or more processors, cause the apparatus to:
determine the expected quantity of registration requests by determining, based on an upper boundary and a lower boundary of a re-registration period within one of the plurality of repeating time intervals, the expected quantity of registration requests received by the server.

22. The apparatus of claim 14, wherein the instructions, when executed by the one or more processors, cause the apparatus to:
determine the quantity of registration requests received by a server during each of the repeating time intervals by determining the quantity of registration requests received by the server via a Voice over Internet Protocol (VoIP) network.

23. One or more non-transitory computer-readable media storing instructions that, when executed, cause:
determining, for a plurality of repeating time intervals, a quantity of registration requests received by a server during each of the repeating time intervals;
determining, based on the quantity of registration requests received by the server during each of the repeating time intervals, an expected quantity of registration requests received by the server;
retrieving, for a recent repeating time interval, a quantity of recent registration requests received by the server;
determining a source of an error based on determining whether the quantity of recent registration requests satisfies a first threshold or a second threshold of the expected quantity of registration requests, wherein the quantity of recent registration requests satisfying the first threshold is associated with a first source of error and the quantity of recent registration requests satisfying the second threshold is associated with a second source of error; and
sending a network alert indicating the determined source of the error.

24. The one or more non-transitory computer-readable media of claim 23, wherein the instructions, when executed, cause the determining the expected quantity of registration requests by causing:
determining a historical quantity of registration requests received by the server.

25. The one or more non-transitory computer-readable media of claim 23, wherein the first threshold and the second threshold of the expected quantity of registration requests are based on a historical quantity of registration requests received by the server.

26. The one or more non-transitory computer-readable media of claim 23, wherein the first threshold is an upper boundary of the expected quantity of registration requests and the second threshold is a lower boundary of the expected quantity of registration requests.

27. The one or more non-transitory computer-readable media of claim 23, wherein the instructions, when executed, cause:
storing a registration history comprising a historical quantity of registration requests received by the server; and
determining, based on the registration history, the first threshold and the second threshold of the expected quantity of registration requests.

28. The one or more non-transitory computer-readable media of claim 23, wherein the instructions, when executed, cause the determining the expected quantity of registration requests by causing:
determining, based on a time associated with the recent registration requests, a subset of registration requests received by the server; and
determining, based on the subset and the quantity of registration requests received by the server during each of the repeating time intervals, the expected quantity of registration requests.

29. The one or more non-transitory computer-readable media of claim 23, wherein the instructions, when executed, cause the determining the expected quantity of registration requests by causing:
determining, based on a re-registration period within one of the plurality of repeating time intervals, the expected quantity of registration requests received by the server.

30. The one or more non-transitory computer-readable media of claim 23, wherein the instructions, when executed, cause the determining the expected quantity of registration requests by causing:
determining, based on an upper boundary and a lower boundary of a re-registration period within one of the plurality of repeating time intervals, the expected quantity of registration requests received by the server.

31. The one or more non-transitory computer-readable media of claim 23, wherein the instructions, when executed, cause the determining the quantity of registration requests received by a server during each of the repeating time intervals by causing:
determining the quantity of registration requests received by the server via a Voice over Internet Protocol (VoIP) network.

* * * * *

UNITED STATES PATENT AND TRADEMARK OFFICE
CERTIFICATE OF CORRECTION

| | |
|---|---|
| PATENT NO. | : 11,223,945 B2 |
| APPLICATION NO. | : 16/596820 |
| DATED | : January 11, 2022 |
| INVENTOR(S) | : Yubin Li and Jiongkuan Hou |

It is certified that error appears in the above-identified patent and that said Letters Patent is hereby corrected as shown below:

In the Specification

Detailed Description, Column 8, Line 59:
Please delete "104" and insert --304--

Detailed Description, Column 11, Line 53:
Delete "$N_{up}$ to $N_{low}$," and insert --$N_{up}$ to $N_{low}$--

Detailed Description, Column 13, Line 25:
Delete "$T_{low}$," and insert --$T_{low}$--

Signed and Sealed this
Sixth Day of June, 2023

Katherine Kelly Vidal
*Director of the United States Patent and Trademark Office*